United States Patent
Hansen et al.

[19]

[11] Patent Number: 5,932,832
[45] Date of Patent: Aug. 3, 1999

[54] HIGH PRESSURE RESISTANT INITIATOR WITH INTEGRAL METAL OXIDE VARISTOR FOR ELECTRO-STATIC DISCHARGE PROTECTION

[75] Inventors: David D. Hansen, Clearfield; Mark B. Woodbury, North Salt Lake; Virginia E. Chandler, Ogden; David B. Monk, Kaysville; Harry W. Miller, II, Ogden; Gerold W. Pratt, Bountiful, all of Utah

[73] Assignee: Autoliv ASP, Inc., Ogden, Utah

[21] Appl. No.: 08/632,700

[22] Filed: Apr. 15, 1996

[51] Int. Cl.⁶ .................................................. F42B 3/182
[52] U.S. Cl. ................................ 102/202.4; 102/202.2; 102/202.9
[58] Field of Search .................. 102/202.4, 202.2, 102/202.1, 202.7, 202.9, 202.14, 202.5; 280/741

[56] References Cited

U.S. PATENT DOCUMENTS

| | | | |
|---|---|---|---|
| 3,101,669 | 8/1963 | Gatley et al. | 102/202.14 |
| 3,318,243 | 5/1967 | Miller | 102/202.4 |
| 3,420,174 | 1/1969 | Potter | 102/202.4 |
| 3,683,811 | 8/1972 | Driscoll | 102/202.4 |
| 3,821,686 | 6/1974 | Harnden, Jr. | 338/21 |
| 3,928,245 | 12/1975 | Fishman et al. | 252/521 |
| 4,041,436 | 8/1977 | Kouchich et al. | 338/21 |
| 4,061,088 | 12/1977 | Ueda | 102/204 |
| 4,103,274 | 7/1978 | Burgess et al. | 338/21 |
| 4,103,619 | 8/1978 | Fletcher et al. | |
| 4,306,499 | 12/1981 | Holmes | 102/202.4 |
| 4,422,381 | 12/1983 | Barrett | 102/202.2 |
| 4,441,427 | 4/1984 | Barrett | 102/202.6 |
| 4,517,895 | 5/1985 | Rucker | 102/202.2 |
| 4,648,319 | 3/1987 | Westerlund et al. | 102/202.12 |
| 4,686,903 | 8/1987 | Witter | 102/202.5 |
| 4,901,183 | 2/1990 | Lee | 361/56 |
| 5,016,914 | 5/1991 | Faigle et al. | 280/741 |
| 5,036,768 | 8/1991 | Dow et al. | 102/202.2 |
| 5,131,679 | 7/1992 | Novak et al. | 280/736 |
| 5,200,574 | 4/1993 | Cunningham et al. | 102/530 |
| 5,230,287 | 7/1993 | Arrell, Jr. et al. | 102/202.5 |
| 5,241,910 | 9/1993 | Cunningham et al. | 102/530 |
| 5,243,492 | 9/1993 | Marquit et al. | 361/247 |
| 5,243,911 | 9/1993 | Dow et al. | 102/202.2 |
| 5,279,225 | 1/1994 | Dow et al. | 102/202.2 |
| 5,345,872 | 9/1994 | Takahashi et al. | 102/202.2 |
| 5,353,707 | 10/1994 | Duguet | 102/290 |
| 5,355,800 | 10/1994 | Dow et al. | 102/202.2 |
| 5,367,956 | 11/1994 | Fogle, Jr. | 102/202.2 |
| 5,431,101 | 7/1995 | Arrell, Jr. et al. | 102/202.5 |
| 5,433,147 | 7/1995 | Brede et al. | 102/202.2 |
| 5,495,806 | 3/1996 | Willley | 102/202.14 |
| 5,558,366 | 9/1996 | Fogle, Jr. et al. | 280/736 |
| 5,616,881 | 4/1997 | Hansen | 102/202.4 |
| 5,621,183 | 4/1997 | Bailey | 102/202.7 |

FOREIGN PATENT DOCUMENTS 0631104  12/1994  European Pat. Off. .

OTHER PUBLICATIONS

V. Menichelli, A Varistor Technique to Reduce the Hazards of Electrostatics to Electroexplosive Devices (1974).
Raychem Corp. product brochure, "Unilok Rings," May 1991.

Primary Examiner—Charles Jordan
Assistant Examiner—Christopher K. Montgomery

[57] ABSTRACT

A resistant initiator for an automobile passenger restraint system which includes a shell casing having an upper chamber and a lower chamber. Contact pins connect the initiator to a mating electrical connector of a vehicle. A metal oxide varistor disposed in the shell casing provides electrostatic discharge and EMI/RFI rotection for the initiator. A glass to metal seal header is formed in the shell casing and includes an integrated circuit for igniting the pyrotechnic material disposed in a charge holder attached to the shell casing.

9 Claims, 6 Drawing Sheets

HIGH PRESSURE RESISTANT INITIATOR WITH INTEGRAL METAL OXIDE VARISTOR FOR ELECTRO-STATIC DISCHARGE PROTECTION

This application is related to copending application U.S. Ser. No. 08/456,257 entitled "Inflator Socket Pin Collar for Initiator with Integral Metal Oxide Varistor for Electrostatic Discharge Protection"; and U.S. Ser. No. 08/574,426 entitled "Inflator Initiator with Zener Diode Electrostatic Discharge Protection", both assigned to the assignee of the present invention.

BACKGROUND OF THE INVENTION

1. Field of the Invention

The present invention relates to an electro-explosive device or initiator for an automobile passenger restraint electrical system, and more particularly, to an initiator which includes a metal oxide varistor for electro-static protection of the electro-explosive device.

2. Description of the Related Art

It is known in the prior art to employ an inflatable occupant restraint system for protecting a passenger of an automobile. Such restraint systems encompass a reaction canister which houses a gas generator or inflator, and an air bag in an uninflated condition. In response to a collision, the gas generator generates gas to inflate and expand the air bag to protect the vehicle occupant.

Inflators for automobile passive restraint systems or other devices require a pyrotechnic initiator or electro-explosive device (EED) to operate the inflator. For actuating the gas generator or inflator an electro-explosive device starts the material of the gas generator burning. The inflator initiator is connected to a crash sensor that is positioned adjacent the initiator or at a remote location in the vehicle.

In operation, the crash sensor sends an electrical signal to the initiator. The initiator fires into the ignitor chamber and ruptures a container, which holds an ignitor material, commonly a mixture of boron and potassium nitrate. The initiator consists of a pair of spaced parallel electrical pins joined at one end by a bridge wire which is embedded within pyrotechnic material. The pyrotechnic material burns with a very hot flame and ignites solid fuel gas generant pellets contained in the combustion chamber. The pellets release a nitrogen gas, which travels through the diffuser chamber and into the protective air bag for protecting occupants of the vehicle.

A common characteristic of electro-explosive devices (EED's) is the susceptibility of the bridge wire to undesirable energy from outside environmental sources which could lead to an inadvertent deployment or "dudding" of the initiator. The undesirable energy may be either, but not limited to, electro-static discharge (ESD), radiant electromagnetic interference (EMI) or radio frequency interference (RFI). Protection against such radiant energy will herein be referred to as EMI/RFI protection.

One prior art solution to overcome EMI/RFI hazard involves the use of a ferrite bead disposed directly within a chamber of the initiator. The ferrite bead absorbs the extraneous energy preventing the energy from reaching the bridge wire. See U.S. Pat. No. 4,306,499 to Holmes, which is assigned to the assignee of the present invention.

A problem with the electro-explosive device of Holmes is that incorporation of the EMI/RFI protection directly within the confines of the EED increases both the size of the device, as well as, manufacturing costs and time. Moreover, the manufacturer of the gas generator is limited to a specific EED design.

Another solution is a universal squib connector which encompasses a ferrite bead which surrounds the electrical terminal of the EED. See U.S. Pat. Nos. 5,200,574 and 5,241,910 to Cunningham et al., assigned to the assignee of the present invention. Cunningham et al. discloses a universal connector encompassing EMI/RFI protection, which are permanently secured within the gas generator. The ferrite bead, electrically, is essentially an inductor which impedes the instantaneous change in current flow.

Another problem with known inflator assemblies is that the initiator (EED) is crimped into the inflator base. This crimping process often damages the initiator if done improperly.

U.S. Pat. No. 4,103,619 discloses an electro-explosive device wherein the contact pins of the device are sealed with glass and a resistant shunt is provided for protecting the bridge circuit from extraneous energy. One disadvantage of the resistant shunt is a percentage of the energy being supplied to the initiator during the deployment sequence is shunted to ground, thus requiring substantially more total energy than would be needed if the resistant shunt was not present.

U.S. Pat. No. 4,422,381 discloses an ignitor incorporating a ferrite sleeve (EMI/RFI) and static discharge disc (ESD). The static discharge disc relies on a "spark gap" method for ESD protection and is limited in its usefulness to a specific type of electro-static discharge voltage, i.e. typically greater than 25,000 volts dc. The current invention utilizes the metal oxide varistor which can tailor the ESD protection to a wider voltage level range by varying the dimension of the varistor. The current invention is designed to shunt to ground any extraneous voltage in excess of 500 volts dc.

FIGS. 1–6 disclose various prior art initiators. FIG. 1 discloses a low cost ignitor, manufactured by ICI Explosives of Tamaqua, Pa., which incorporates a spark gap ring for ESD protection. FIG. 2 illustrates a hybrid initiator, also manufactured by ICI Explosives, which includes two pins and a shunt wire, in essence acting as a co-axial initiator. FIG. 3 illustrates another low cost initiator, such as the initiator manufactured by Quantic Industries of San Carlos, Calif. The prior art initiator of FIG. 4 is a pin-type initiator using an offset co-axial header design, such as the initiator manufactured by Special Devices Inc. of Newhall, Calif. Prior art FIG. 5 discloses a leadwire initiator having a centered co-axial design, also manufactured by ICI Explosives of Tamaqua, Pa. FIG. 6 is an advanced driver initiator having a co-axial centered design, manufactured by OEA Inc. of Englewood, Colo. One disadvantage of all of the prior art initiators of FIGS. 1–6, is the necessity of complete electrical isolation.

The use of a metal oxide varistor (MOV) to absorb electrostatic energy in an electro-explosive device has recently been explored. See, V. Menichelli, *A Varistor Technique to Reduce the Hazards of Electrostatics to Electroexplosive Devices*, (1974). See also U.S. Pat. Nos. 4,103,274, 4,041,436 and 3,821,686.

Typically, metal oxide varistors are used in surge suppression devices, such as computers. However, the prior art has not explored the use of a MOV in an electro-explosive device for use in an air bag gas generator.

SUMMARY OF THE INVENTION

The high pressure resistant initiator of the present invention serves as an electrical connection between the automotive passive restraint system electrical harness assembly and the electro-explosive device circuit element bridge.

It is an object of the present invention to provide an initiator (EED) which includes a glass to metal seal header which allows the use of an integrated circuit which may be a semiconductor bridge (SCB), a printed circuit bridge (PCB), a thick film/thin film pyrotechnic mixture deposition, or a traditional hot wire bridge.

It is another object of the present invention to provide an initiator (EED) incorporating a metal oxide varistor for the electro-static protection of the initiator. The integral metal oxide varistor (MOV) is superior for protecting an integrated circuit initiator from electro-static discharge. The metal oxide varistor is an improvement over the spark gap method of the prior art because of improved heat dissipating characteristics due to the placement of the metal oxide varistors between the socket pins and the collar. The MOV can be tailored to meet customer specific voltage protection by varying the thickness and length of the MOV.

Another advantage of the present invention is the possibility of using a manufacturing technique of either laser welding, adhesive bonding or a combination thereof, between various components to provide a hermetic seal without damaging the initiator. The charge holder and closure disc assembly also utilizes a laser welded/adhesive bond to provide a pressure resistant and hermetic seal. Moreover, the stainless steel shell casing, the laser weld/adhesive bond, and the glass to metal seal header provide high pressure protection.

Still another object of the present invention is to provide a high pressure resistant initiator having an integrated circuit bridge element with a deposited explosive layer and a channel for locating the integrated circuit bridge between pins of the glass to metal seal header.

In accomplishing these and other objectives of the invention, there is provided a high pressure resistant initiator of an automobile passenger restraint electrical system which includes a shell having an upper chamber and a lower chamber. Means connect the initiator to an electrical connector of a vehicle, the lower chamber is capable of receiving the electrical connector. Electrostatic discharge protecting means are disposed in the shell for protecting the initiator from electrostatic discharge. Means for housing a pyrotechnic material are attached to the shell. A glass to metal seal header is also attached to the shell. The glass to metal seal header includes integrated circuit means for igniting the pyrotechnic material. Means hermetically seal the glass to metal seal header to the shell.

Other features and advantages of the present invention will become apparent from the following description of the invention which refers to the accompanying drawings.

DETAILED DESCRIPTION OF THE PREFERRED EMBODIMENTS

Figure 1:
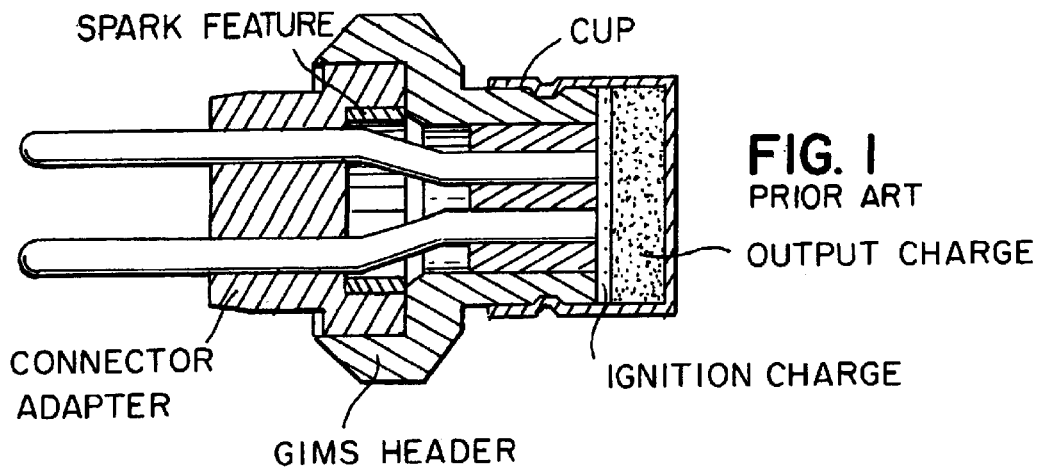
FIGS. 1–6 are cross-sections of known prior art initiators.
Figure 2:
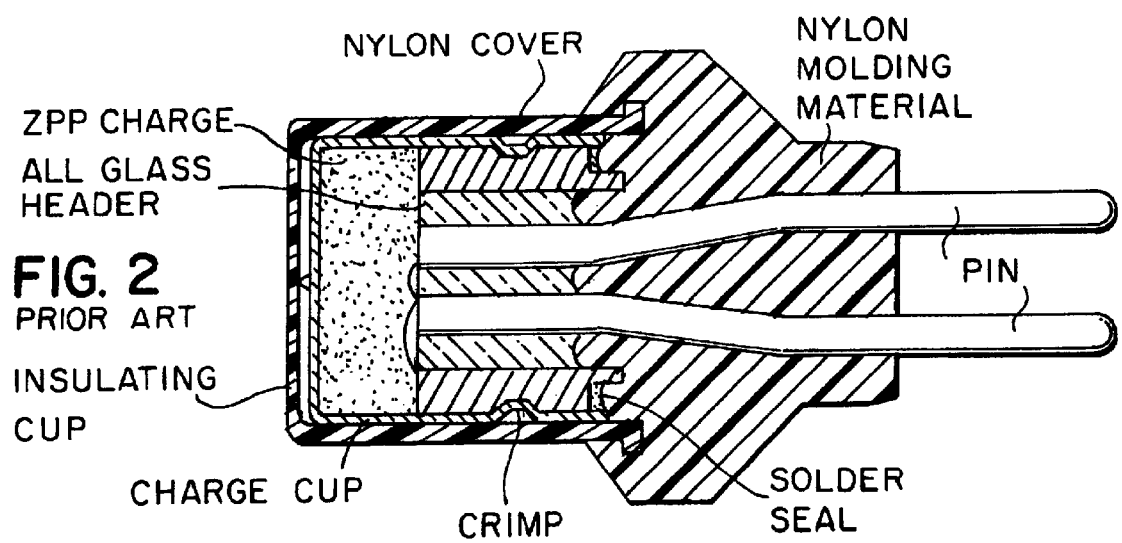
Figure 3:
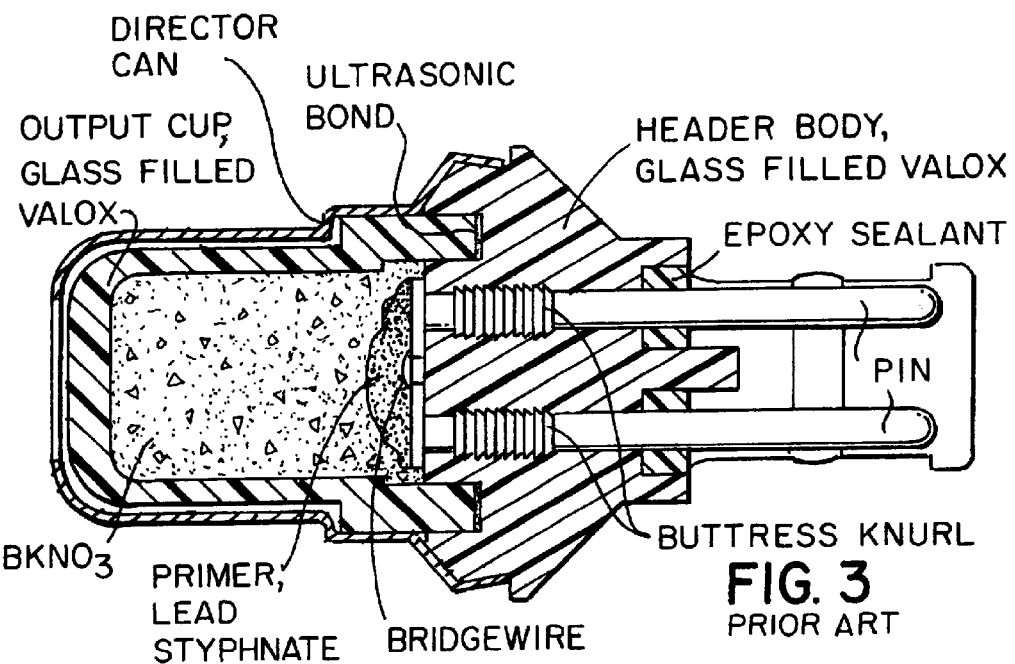
Figure 4:
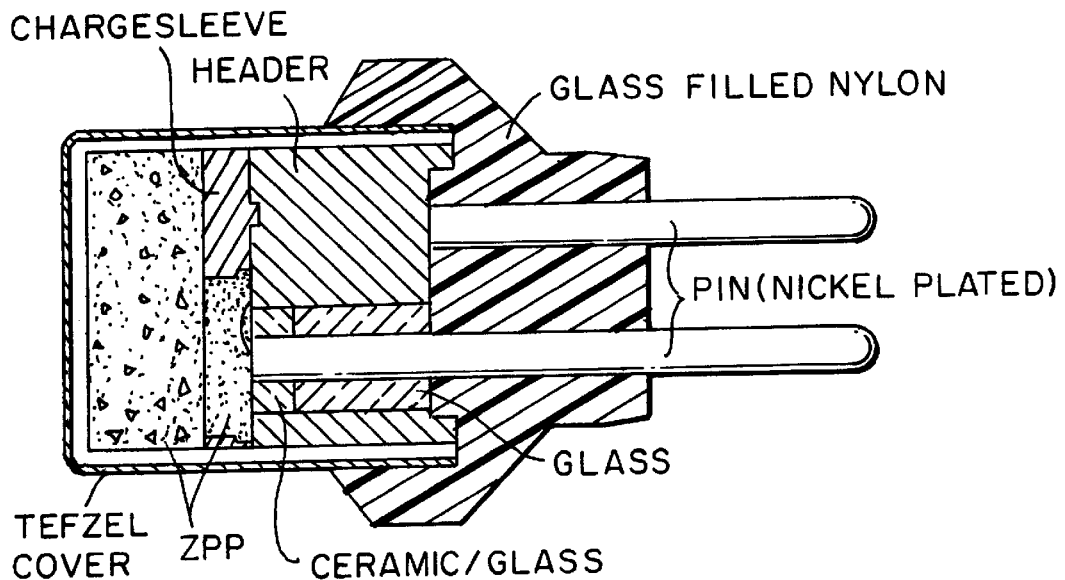
Figure 5:
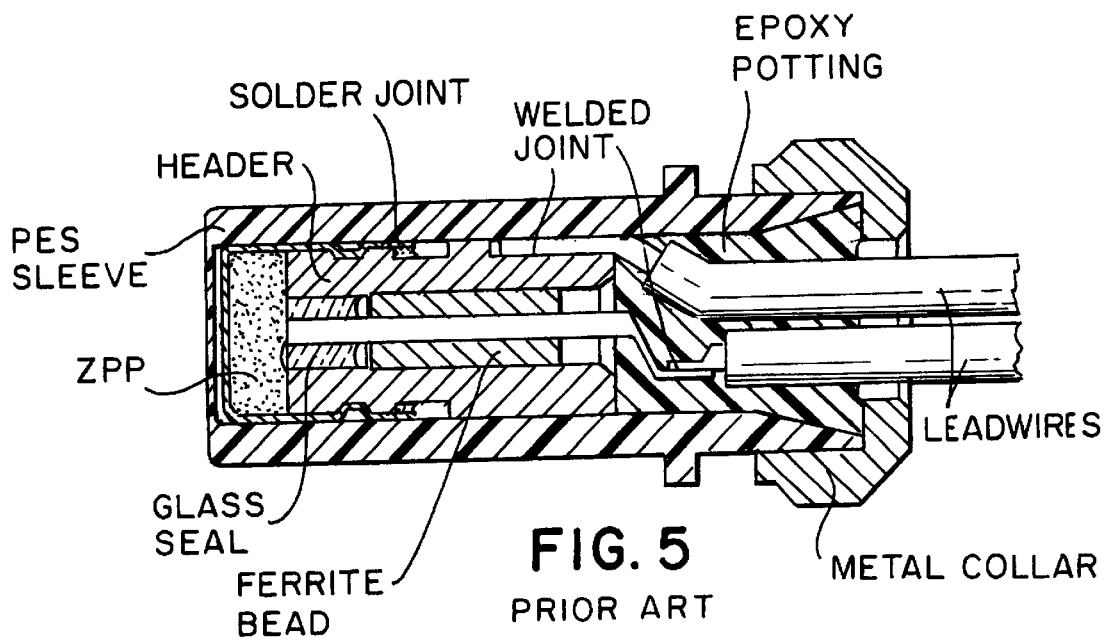
Figure 6:
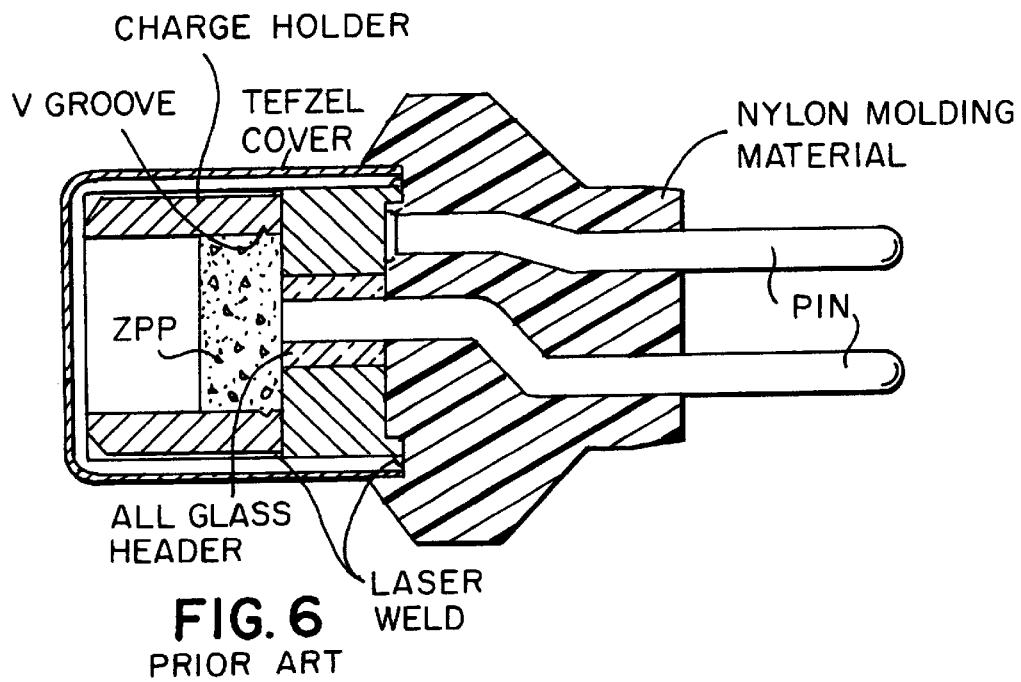
Figure 7:
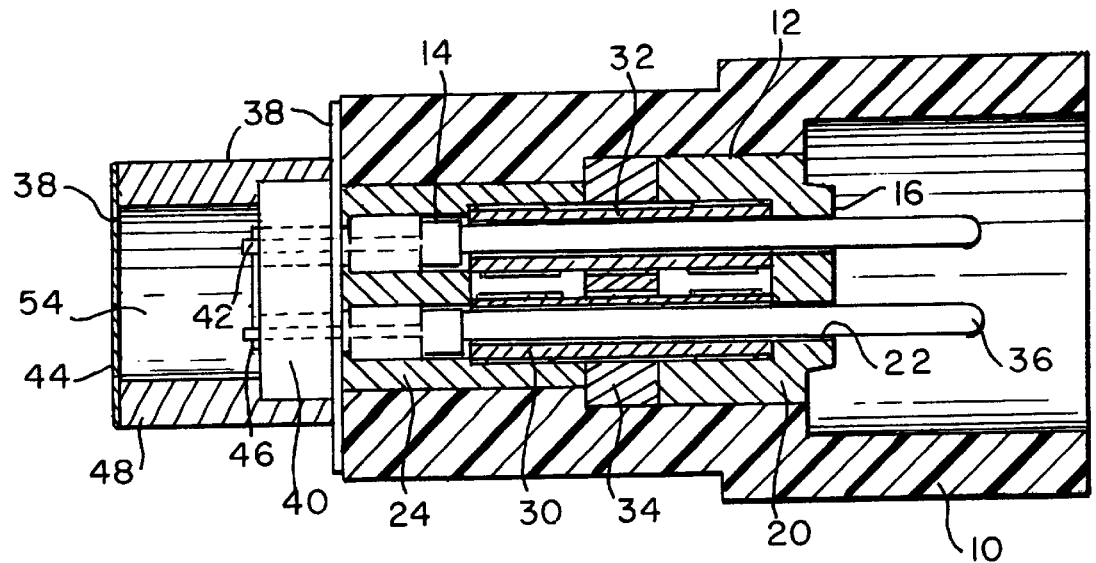
FIG. 7 is a cross-section of a first embodiment of the high pressure resistant initiator of the present invention.

Referring to FIG. 7, there is shown a first embodiment of the high pressure resistant initiator of the present invention. The initiator is located within a gas inflator (not shown). The initiator includes a shell or casing 10. Shell casing 10 is made of machined stainless steel or either pressed or injection molded stainless steel. It should be appreciated that the shell casing can be made from other materials without departing from the scope of the invention.

Figure 10:
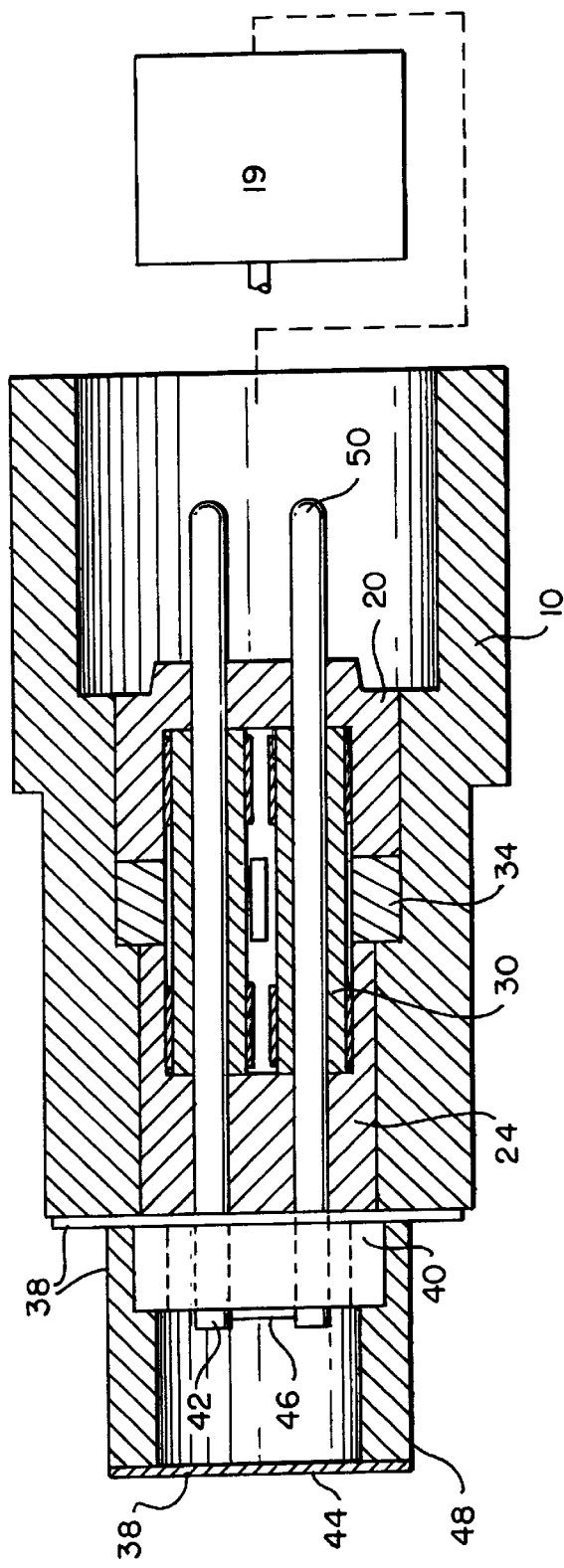
FIG. 10 is a cross-section of a second embodiment of the initiator of the present invention.

Shell casing 10 is divided into two chambers, lower chamber 12 and upper chamber 14. Lower chamber 12 facilitates the electrical interface with an automobile passive restraint system electrical harness assembly 19 (FIG. 10).

Figure 8:
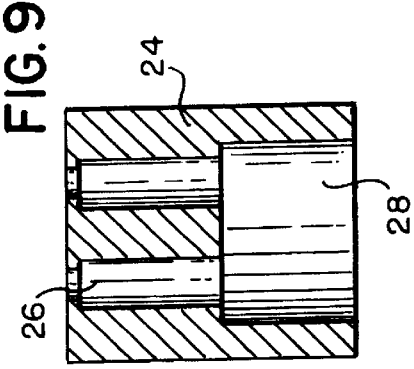
FIG. 8 is an enlarged cross-section of a first molded insert of the high pressure resistant initiator of the present invention.

Lower chamber 12 receives a first pre-molded plug 20. As shown in FIG. 8, plug 20 includes a cavity 18, apertures 22 and an electrical connector interface 16 which aligns with the mating connector orientation feature of the electrical harness assembly 19.

Figure 9:
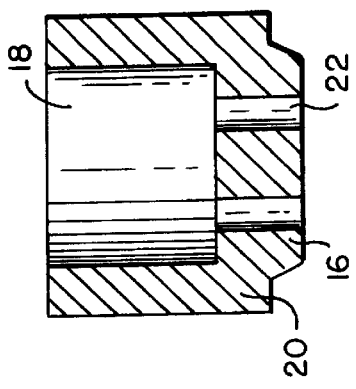
FIG. 9 is an enlarged cross-section of a second molded insert according to the present invention.

Upper chamber 14 receives a second pre-molded plug 24. As shown in FIG. 9, plug 24 includes a cavity 28 and apertures 26 which support and align socket pins 36 and a metal oxide varistor 30, which will be described further herein. Both plugs 20 and 24 can be made of a plastic material.

Socket pins 36 extend through shell casing 10 and provide the electrical connection between the electrical harness assembly 19 and the integrated circuit initiator 46.

Referring again to FIG. 7, surrounding each of the socket pins 36 is a metal oxide varistor 30. Metal oxide varistor 30 is tubular-shaped and is interference fitted over the socket pins. The length and thickness of metal oxide varistor 30 determines the actual breakdown voltage and thus, allows conformance to specific customer requirements. Metal oxide varistors can be fabricated by pressing and sintering a mixture of metal oxide powder at a temperature of and about 1300° C. to form a generally hard, brittle ceramic body. It should be appreciated that the MOV of the present invention can be produced from other suitable materials and methods, which will be described herein. When assembled, metal oxide varistors 30 extend into both cavities 28 and 18 of plugs 24 and 20.

Lower chamber 12 also includes a low ohmic resistance metal sleeve 34 which provides the electrical connection between metal oxide varistor 30 and shell casing 10. Sleeve 34 includes apertures 32, through which socket pins 36 and the respective surrounding metal oxide varistors 30 pass when the initiator is assembled. Sleeve 34 is sandwiched between plugs 20 and 24 such that the respective apertures 26, 32 and 22 are in alignment.

Attached to the shell casing assembly is a glass to metal seal header 40. A glass to metal seal provides a way to hermetically pass an electrical conductor from one environment to another. The glass, in addition to providing the seal, acts as an insulator between the pins and between the pins and the shell casing. The glass to metal seal assembly of the present invention is manufactured by fixturing the shell casings and the pins therein within a graphite plate. The glass mixture is placed within the desired area and the fixture is then placed on a belt driven conveyor which passes the fixture through a high temperature oven which elevates the temperature of the glass to its liquid state. Upon exiting the cool down chamber of the oven, the glass solidifies and adheres to the metal surfaces forming a hermetic seal between the pins and glass and the shell casing and the glass.

Header 40 provides an attachment plane for the integrated circuit 46. Integrated circuit 46 can be a semiconductor bridge, a printed circuit bridge using conventional suitable refractory metal, a thick/thin film of pyrotechnic mixture deposition bridge or a "hot wire" bridge device for igniting pyrotechnic material 54 enclosed in a charge holder 48 of the initiator. Header 40 includes pins 42 which mate with socket pins 36. Header pins 42 typically have a diameter in the range of 0.020 in.

To provide a hermetic seal the glass to metal seal header 40 is attached to shell casing 10 by either a circumferential laser weld joint or an adhesive bonding method as indicated at 38 in FIG. 7. The laser weld/adhesive bond process provides a superior circumferential hermetic seal.

As shown in FIG. 7, attached to the glass to metal seal header 40 is charge holder 48, which contains the pyrotechnic material, and a closure disc assembly 44. To provide an additional hermetic seal, charge holder 48 is attached to header 40, and disc 44 is attached to charge holder 48 by either circumferential laser weld joint/adhesive bonding method 38.

FIG. 10 discloses a second embodiment of the high pressure resistant initiator of the present invention. The embodiment of FIG. 10 is identical to the previous embodiment, with the exception of solid feed through pins 50 which are encapsulated in the glass to metal seal header 40. Wherever possible, in all of the embodiments of the present invention, like numerals have been used to indicate like parts. Since pins 50 do not include sockets, as in the first embodiment, the apertures 26 of plug 24 can be slightly smaller.

Next, the method of assembling the high pressure resistant initiator of FIG. 7 will be described. The plug 20 and sleeve 34 are press fit into chamber 12 of shell casing 10. Next, a metal oxide varistor 30 is interference fitted around each of the contact pins 36. A sub-assembly consisting of contact pins 36 and metal oxide varistor 30 is then inserted into cavities 26 and 28 of plug 24. This sub-assembly is next inserted into cavity 14 of shell casing 10 until the solid ends of contact pins 36 protrude into apertures 22 of plug 20.

The pins 42 of glass to metal seal header 40, which has an integrated circuit 46 attached, is inserted into the socket of pins 36 and charge holder 48 is placed over header 40. A circumferential weld joint/adhesive bonding method 38 is performed to attach the header to the shell casing 10 and the charge holder 48 to header 40. Pyrotechnic powder mixture 54 is then loaded into charge holder 48 and closure disc 44 is attached to the charge holder 48 by a circumferential weld joint/adhesive bonding method 38. The shell casing 10 is then mounted in a gas inflator by any suitable means.

During the assembly of the high pressure resistant initiator of FIG. 10, the plug 20 and sleeve 34 are press fit into chamber 12 of shell casing 10. The glass to metal seal header assembly consisting of header 40 and pins 50 is then inserted into cavity 26 of plug 24 and metal oxide varistor 30 is interference fitted around each of the contact pins 50, and metal oxide varistor 30 is inserted into cavity 28 of plug 24. This sub-assembly is next inserted into cavity 14 of shell casing 10 until the solid ends of pins 50 protrude through apertures 22 of plug 20.

Charge holder 48 is placed over header 40 and a circumferential weld joint/adhesive bonding method 38 is performed to attach the header to shell casing 10 and charge holder 48 to header 40. Pyrotechnic powder mixture 54 is then loaded into charge holder 48 and closure disc 44 is attached thereto by a circumferential weld joint/adhesive bonding method 38. Shell casing 10 is then mounted in a gas inflator by any suitable means.

Figure 11:
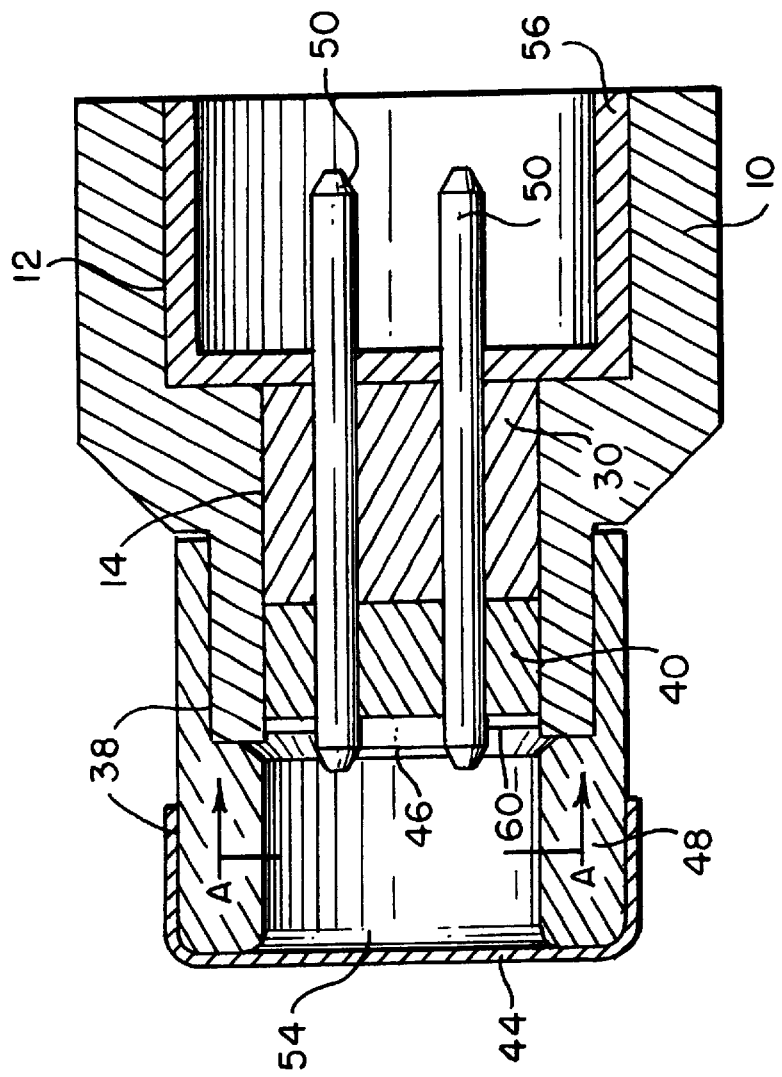
FIG. 11 is a cross-section of a still another embodiment of the initiator of the present invention.
Figure 12:
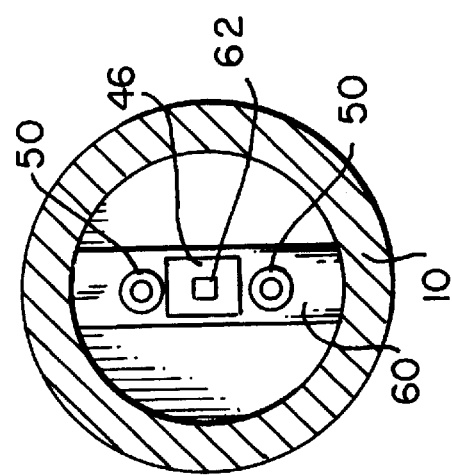
FIG. 12 is a cross-section of the initiator of FIG. 11, taken along line A—A.

Referring to FIGS. 11 and 12, a third embodiment of the resistant initiator of the present invention will be described. Shell casing 10 includes a single pre-molded plastic plug 56 press fit in lower chamber 12. Plug 56 is cup-shaped and includes an interface feature along its inner surface for mating with a connector of an electrical harness assembly (not shown) of the restraint system.

Upper chamber 14 of shell casing 10 includes metal oxide varistor 30 and glass to metal seal header 40. Metal oxide varistor 30 can be either a) formed about each of the pins 50 by consolidating a formulation of reconstituted metal oxide powders followed by a sintering operation; b) an integral cohesive compound of the glass to metal seal header formed by blending the metal oxide powder with the glass mixture followed by a sintering operation, thus, forming an integral cohesive metal oxide varistor and glass to metal seal; or c) a preformed slug or insert which is formed by consolidating metal oxide powders and sintering the slug to form a hardened ceramic material which is pressed into position during the manufacturing process.

In still another variant, the metal oxide varistor can be located on an integrated circuit chip package disc within chamber 14, or the integrated circuit 46 and varistor can be located on a single integrated circuit disc.

In the embodiment of FIGS. 11 and 12, glass to metal seal header 40 includes a channel 60 which functions as an alignment mechanism for the integrated circuit 46 between pins 50. Referring to FIG. 12, an explosive composition 62, which acts as the primary ignition source, is deposited directly onto the integrated circuit bridge element.

Attached to shell casing 10 is the charge holder 48 and closure disc 44 assembly which contains the pyrotechnic mixture 54. To provide a hermetic seal, the charge holder 48 is attached to shell casing 10 and disc 44 is attached to holder 48 by circumferential laser weld joint/adhesive bonding method 38.

Figure 13:
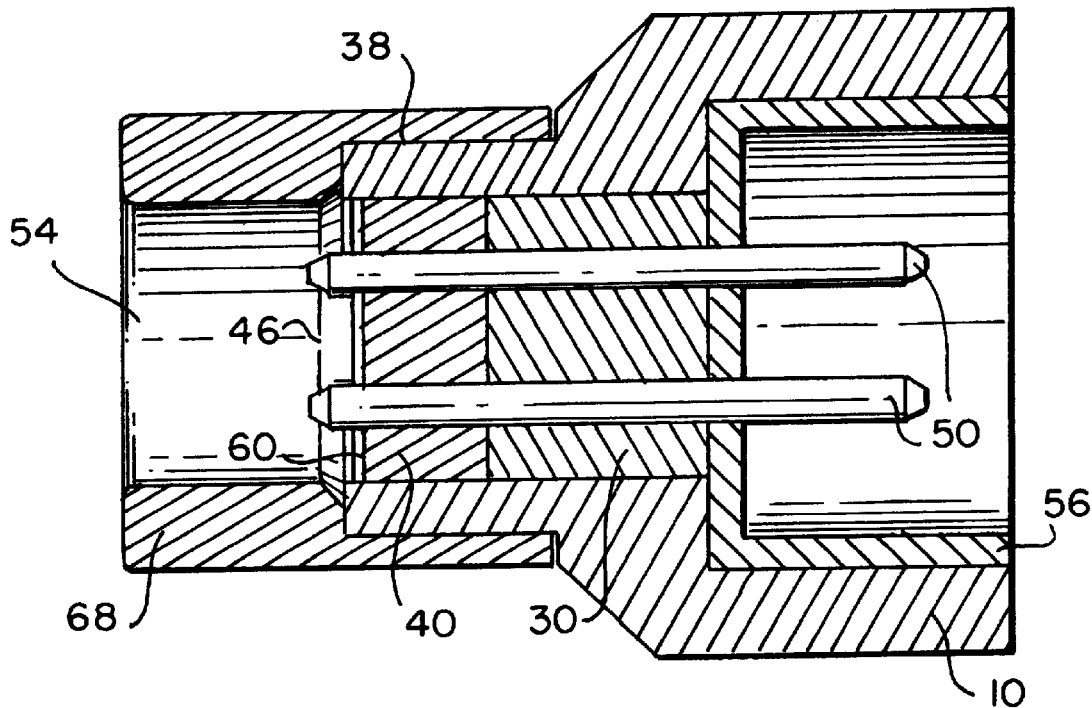
FIG. 13 is a cross-section of a fourth embodiment of the initiator of the present invention.

The embodiment of FIG. 13 is identical to the embodiment of FIGS. 11–12, with the exception of a closure cup 68 which replaces the charge holder 48 and closure disc 44 assembly of the previous embodiments. Cup 68 is a single unit, closed bottom cup which contains pyrotechnic mixture 54 and is hermetically sealed to shell casing 10 via circumferential laser weld joint/adhesive bonding method 38.

Figure 14:
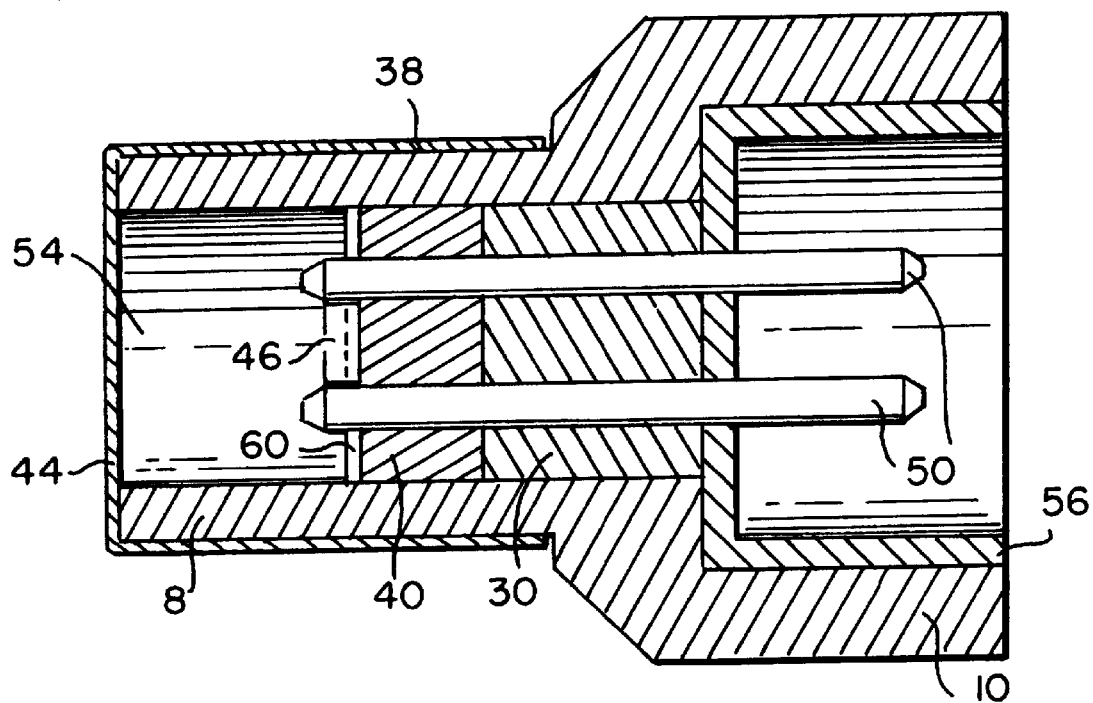
FIG. 14 is a cross-section of a fifth embodiment of the initiator of the present invention.

The embodiment of FIG. 14 is identical to the embodiment of FIGS. 11–12, with the exception that shell casing 10 includes lengthened end wall 8 which serves as the charge holder for the pyrotechnic mixture and therefore eliminates the need for a separate charge holder 48. Thus, glass to metal seal header 40 is recessed within shell casing 10. A cup-shaped closure disc, similar to disc 44 of FIG. 11, is attached to side wall 8 of shell casing 10 via circumferential laser weld joint/adhesive bonding method 38.

Next the method of assembling the embodiments of FIGS. 11–14 will be described. The metal oxide varistor can be formed along with the glass to metal seal to produce an integral cohesive assembly including shell casing 10, pins 50, header 40 and metal oxide varistor 30. The metal oxide varistor can also be a separate component which is inserted into the cavity directly behind glass header 40. Plug 56 is press fit within shell casing 10 until it reaches the bottom of the cavity. An adhesive compound is deposited between pins 50 along the channel 60 to secure the integrated circuit 46 to glass header 40. The integrated circuit 46 is then positioned between pins 50 using the channel 60 as a self-alignment mechanism. Conductive adhesive, wire bond, or solder is used to electrically connect integrated circuit 46 to pins 50.

Referring to the embodiment of FIG. 11, charge holder 48 is then attached to shell casing 10 and pyrotechnic mixture 54 is loaded into charge holder 48. Closure disc 44 is then attached to the charge holder 48 via a circumferential weld joint/adhesive bonding method 38.

Next, referring to FIG. 12, explosive layer 62 is placed directly onto the integrated circuit bridge element and allowed to dry. The remaining assembly steps are similar to the embodiment of FIGS. 11, 13 and 14. It should be appreciated that explosive layer 62 can be used in all embodiments of the present invention.

With the embodiment of FIG. 13, cup 68 is loaded with the pyrotechnic mixture and attached to shell casing 10 by circumferential weld joint/adhesive bonding method 38. In the embodiment of FIG. 14, pyrotechnic mixture 54 is loaded into the cavity and closure disc 44 is attached to shell casing 10 by circumferential weld joint/adhesive bonding method 38.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A high pressure resistant initiator of an automobile passenger restraint electrical system comprising:
    a shell casing having an upper chamber and a lower chamber;
    means for connecting the initiator to an electrical connector of a vehicle, wherein the lower chamber is capable of receiving the electrical connector, the connecting means comprising a pair of elongated pins extending through the upper and lower chambers of the shell casing;
    at least one pre-molded plug disposed within the lower chamber of the shell casing, the pre-molded plug including means for interfacing with the electrical connector;
    a metal oxide varistor disposed in the shell casing for protecting the initiator from electrostatic discharge;
    a glass to metal seal header formed in the shell casing;
    means for housing a pyrotechnic material attached to the glass to metal seal header;
    integrated circuit means for igniting the pyrotechnic material attached to the glass to metal seal header; and
    means for hermetically sealing the glass to metal seal header to the shell casing.

2. The high pressure resistant initiator of claim 1, wherein the glass to metal seal header includes header pins for mating with the pair of pins.

3. The high pressure resistant initiator of claim 2, wherein each of the header pins have a diameter of and about 0.02 in.

4. The high pressure resistant initiator of claim 1, wherein the means for housing the pyrotechnic material comprises a charge holder and closure disc assembly attached to the shell casing, the glass to metal seal header being hermetically sealed within the charge holder.

5. The high pressure resistant initiator of claim 1, wherein the hermetic sealing means comprises a circumferential laser weld.

6. The high pressure resistant initiator of claim 1, wherein the hermetic sealing means comprises an adhesive bond.

7. A high pressure resistant initiator of an automobile passenger restraint electrical system, comprising:
    a shell casing having an upper chamber and a lower chamber;
    means for connecting the initiator to an electrical connector of a vehicle, wherein the lower chamber is capable of receiving the electrical connector, the connecting means comprising a pair of elongated pins extending through the upper and lower chambers of the shell casing;
    a metal oxide varistor disposed in the shell casing for protecting the initiator from electrostatic discharge;
    a first pre-molded plug disposed within the upper chamber of the shell casing and a second pre-molded plug disposed in the lower chamber of the shell casing, both the first and second plugs including means for accommodating the metal oxide varistor and pins;
    a glass to metal seal header formed in the shell casing;
    means for housing a pyrotechnic material attached to the glass to metal seal header;
    integrated circuit means for igniting the pyrotechnic material attached to the glass to metal seal header; and
    means for hermetical sealing the glass to metal seal header to the shell casing.

8. The high pressure resistant initiator of claim 7, further comprising a low-ohmic resistance metallic sleeve disposed in the shell casing between the first and second plugs for providing an electrical connection between the metal oxide varistor and the shell casing.

9. A method of assembling a high pressure resistant initiator including integral electrostatic discharge protection of an automobile passenger restraint electrical system, comprising the steps of:
    providing a shell casing having an upper chamber and a lower chamber;
    inserting a means for connecting the initiator to an electrical connector through the upper and lower chambers;
    forming an electrostatic discharge protecting means for protecting the initiator from electrostatic discharge by consolidating a formulation of reconstituted metal oxide powders into a preformed insert and sintering the insert to form a hardened ceramic material which is press fitted into the shell casing, over the pins;
    inserting the electrostatic discharge protecting means into the shell casing, the electrostatic discharge protecting means being in communication with the connecting means;
    forming a glass to metal seal header inside the shell casing, the glass to metal seal header including integrated circuit means for igniting a pyrotechnic material; and
    hermetically sealing a means for housing the pyrotechnic material and the shell casing.

* * * * *